United States Patent [19]
Mateer et al.

[11] Patent Number: 5,127,979
[45] Date of Patent: * Jul. 7, 1992

[54] DRUM FOR THE FORMATION OF UNCURED TIRE SECTIONS THEREON

[75] Inventors: Donald D. Mateer; John S. Podgorski, both of Greensburg, Pa.

[73] Assignee: McCreary Tire & Rubber Company, Indiana, Pa.

[*] Notice: The portion of the term of this patent subsequent to Mar. 6, 2007 has been disclaimed.

[21] Appl. No.: 475,339

[22] Filed: Feb. 5, 1990

Related U.S. Application Data

[63] Continuation of Ser. No. 182,911, Apr. 18, 1988, Pat. No. 4,906,321.

[51] Int. Cl.⁵ .......................................... B29D 30/24
[52] U.S. Cl. ................................. 156/417; 156/414
[58] Field of Search ............... 156/414, 415, 417, 419, 156/420, 418; 425/182; 242/72 R, 72.1; 279/2 R

[56] References Cited

U.S. PATENT DOCUMENTS

| | | | |
|---|---|---|---|
| 662,091 | 11/1900 | Ricke | 156/417 |
| 1,952,399 | 3/1934 | Ward | 156/417 |
| 2,048,536 | 7/1936 | Bostwick | 156/420 |
| 2,335,169 | 11/1943 | Bostwick | 156/417 |
| 2,514,215 | 7/1950 | Stevens et al. | 156/420 |
| 3,140,216 | 7/1964 | Shilts et al. | 156/417 |
| 3,237,199 | 2/1966 | Brey | 156/398 |
| 3,322,599 | 5/1967 | Bishop | 156/417 |
| 3,346,434 | 10/1967 | Fulton | 156/415 |
| 3,366,526 | 1/1968 | Winslow | 156/420 |
| 3,489,634 | 1/1970 | Pizzo et al. | 156/398 |
| 3,560,301 | 2/1971 | Cantarutti | 156/415 |
| 3,644,162 | 2/1972 | Appleby et al. | 156/415 |
| 3,666,194 | 5/1972 | Gosnell | 242/721 |
| 3,817,812 | 6/1974 | Yabe | 156/415 |
| 3,873,398 | 3/1975 | Yakoo et al. | 156/417 |
| 4,263,083 | 4/1981 | Schleiger | 156/414 |
| 4,269,649 | 5/1981 | Vanderzee | 156/416 |
| 4,292,112 | 9/1981 | Kumagai | 156/415 |
| 4,416,720 | 11/1983 | Baldoni | 156/401 |
| 4,497,498 | 2/1985 | Buck | 242/72 R |
| 4,529,461 | 7/1985 | Caretta et al. | 156/124 |
| 4,584,038 | 4/1986 | Enders | 156/132 |
| 4,614,562 | 9/1986 | Jones | 156/420 |
| 4,673,457 | 6/1987 | Goodfellow | 156/415 |
| 4,685,992 | 8/1987 | Irie | 156/396 |
| 4,711,691 | 12/1987 | Menell et al. | 156/420 |
| 4,906,321 | 3/1990 | Mateer et al. | 156/417 |

Primary Examiner—Geoffrey L. Knable
Attorney, Agent, or Firm—Nils H. Ljungman & Associates

[57] ABSTRACT

The invention features a kit for the construction of a tire forming drum. The tire forming drum has, in an assembled configuration, a tire forming surface for the formation of a tire preform thereon. The kit is comprised of a plurality of assemblable and disassemblable individual and discrete components. Included in the components are a removable mandrel having a substantially central axis, and a peripheral surface substantially encircling the central axis. Also included in the components is a plurality of arcuate drum segment members for substantially encircling, in the assembled configuration, the above-mentioned mandrel. Each of the plurality of arcuate drum segment members have an inner surface which, in the assembled configuration, at least partially contacts the peripheral surface of the mandrel, thereby substantially preventing inward radial movement of the plurality of arcuate drum segment members towards the central axis of the mandrel. Another component is a locking arrangement for substantially preventing outward movement of the plurality of arcuate drum segment members away from the central axis in the assembled configuration. Also included in the components is an arrangement for translating at least one of the plurality of arcuate drum segment members towards the central axis upon removal of the removable mandrel.

22 Claims, 5 Drawing Sheets

DRUM FOR THE FORMATION OF UNCURED TIRE SECTIONS THEREON

This is a continuation of application Ser. No.07/182,911, filed on Apr. 18, 1988 now U.S. Pat. No. 4,906,321.

BACKGROUND OF THE INVENTION

1. Field of the Invention

Well known, in the art of tire making, is the formation, during one part of the tire production process, of an uncured tire. Typically, the uncured tire will include a plurality of biases, or reinforcing portions.

2. Description of the Prior Art

To date, one widely used method of bias tire production known to applicants employs a drum, upon which the various biases and/or belts and constituents comprising the uncured green tire product (or "tire preform") to be produced are assembled. Well known in the art is the process whereby, dependent upon expected working loads, an initial tire preform is fabricated on the drum, and then the resulting preform is formed into the final product, for example, through the use of an internal bladder and an external mold, in which the tire preform is simultaneously formed and cured under heat and pressure.

It will be appreciated that the form (or "drum") upon which the tire preform is constructed must exhibit, throughout the formation process and over its useful lifetime, a given degree of "circularity" or "roundness" or, in other words, a conformance to specifications. Prior tire forming drums are known to applicants which include a series of circumferential segments fabricated of metal and located peripherally about a central hub. The peripheral circumferential surfaces and the segments of such known prior art devices are interconnected with the central hub through linkage mechanisms which may be actuated to either expand or contract the circumferential segments. Thus, the prior art tire forming drums known to applicants involve a diameter altering mechanism which mechanically collapses the drum into itself. These drums are dependent upon the accuracy and specifications to which the linking mechanism is manufactured and to the wear to which such mechanism and the drum itself are subject to during use. Lack of precision relating to the lack of roundness, concentricity, etc. of the drum degrades the quality of the tires produced, increases their rejection rate during manufacture and their failure rate during use. Accordingly, using these prior art arrangements, production and warranty costs are increased.

OBJECTS OF THE INVENTION

An initial object of the present invention is the provision of a tire forming drum which has a reduced dependency upon a linkage mechanism for its degree of "concentricity" and/or "roundness" and cylindricity. Accordingly, costs associated with the manufacture of such a linking mechanism, within specifications, are reduced.

Another object of the present invention is the provision of a tire forming drum which, while exhibiting a superior degree of roundness and/or concentricity, exhibits simplicity in its assembly and disassembly.

Yet another object of the present invention is the reduction of the weight of a tire forming drum for a specific size tire, thereby permitting the manufacture of tires which are larger and heavier than those for which the tire manufacturing machine was originally designed.

SUMMARY OF THE INVENTION

In the first aspect, the invention features a kit for the construction of a tire forming drum. The tire forming drum has, in an assembled configuration, a cylindrical tire forming surface for the formation of a tire preform thereon. The kit is comprised of a plurality of assemblable and disassemblable individual and discrete components. Included in the components are a removable mandrel having a substantially central axis, and a peripheral surface substantially encircling the central axis. Also included in the components is a plurality of arcuate drum segment members for substantially encircling, in the assembled configuration, the above-mentioned mandrel. Each of the plurality of arcuate drum segment members has an inner surface which, in the assembled configuration, at least partially contacts the peripheral surface of the mandrel, thereby substantially preventing inward radial movement of the plurality of arcuate drum segment members towards the central axis of the mandrel. Another component is a locking arrangement for substantially preventing outward movement of the plurality of arcuate drum segment members away from the central axis in the assembled configuration. Also included in the components is an arrangement for translating at least one of the plurality of arcuate drum segment members towards the central axis upon removal of the removable mandrel.

In another aspect, the invention features a drum for assembling thereon a series of plies to form a green tire. The drum is comprised of a plurality of assemblable and disassemblable individual and discrete components. The components are particularly adapted, in an assembled state, for the construction thereon of an uncured tire. One component is a mandrel having a substantially central axis and a peripheral surface encircling the central axis. Another component is a plurality of arcuate drum segment members substantially encircling, in the assembled configuration, the mandrel.

The present invention will now be described by way of particular preferred embodiments, reference being had to the accompanying drawings, wherein:

DESCRIPTION OF THE PREFERRED EMBODIMENTS

Figure 1:
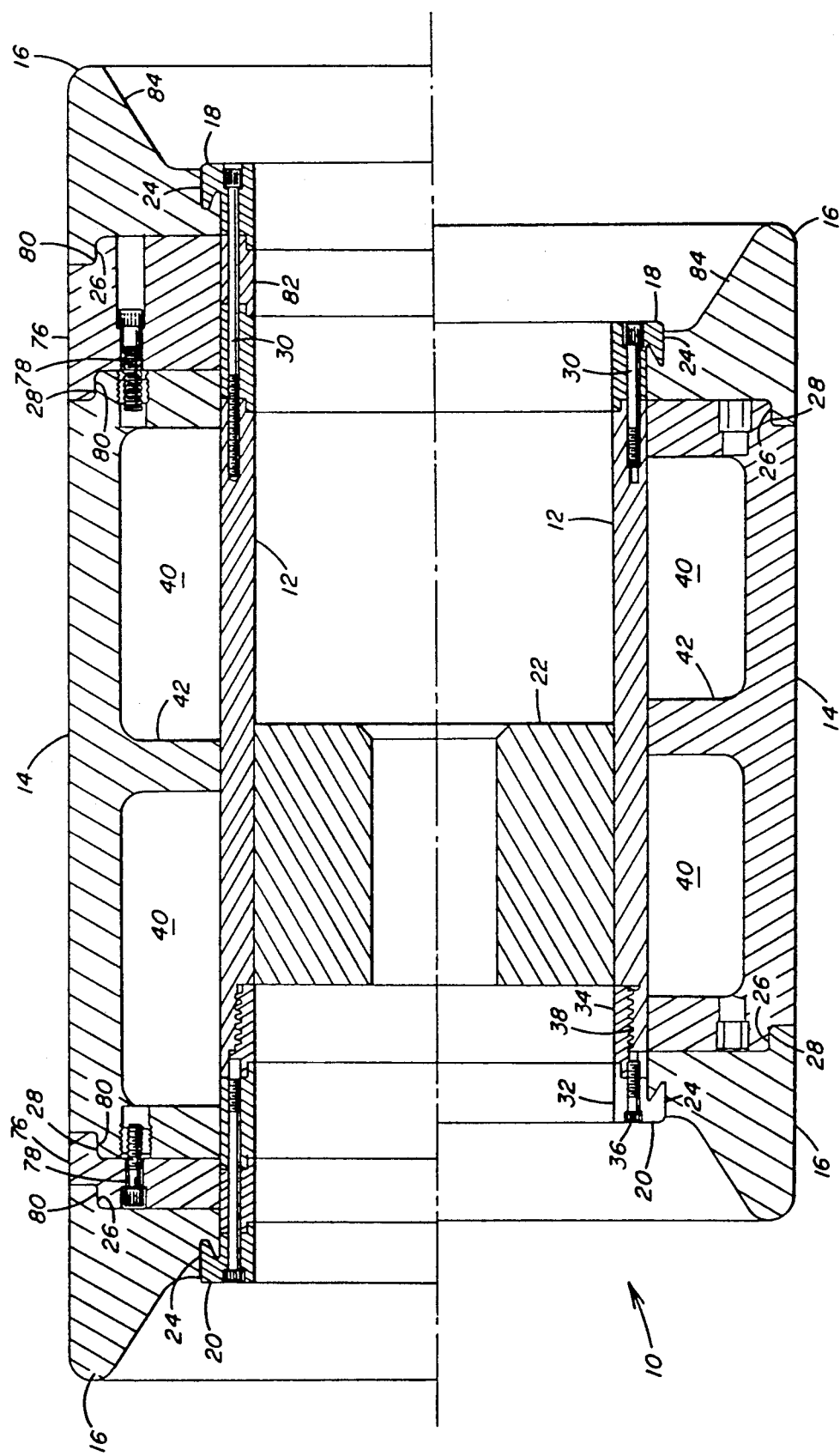
FIG. 1 is an axially cross-sectional view through a tire forming drum constructed according to the present invention, alternative embodiments of the invention being illustrated in the upper and lower portions thereof.

Referring first to the embodiment illustrated in the lower portion of FIG. 1, a tire forming drum 10 according to an embodiment of the present invention includes a centrally disposed and generally cylindrical mandrel 12, a plurality of arcuate drum section members 14 which substantially encircle and abut against the mandrel 12 and a plurality of arcuate end section members 16 positioned axially at both ends of the plurality of arcuate drum section members 12. End segment members 16 also substantially encircle the central mandrel 12 and contact and abut against the drum segment members 14. Also included within the first embodiment of the invention illustrated in the lower portion of FIG. 1 are a pair of lock rings, namely an inboard lock ring 18 and an outboard lock ring 20, as well as a mounting hub 22 centrally located within the mandrel 12 and secured thereto.

Both the inboard lock ring 18 and the outboard lock ring 20 are provided with inwardly extending flanges 24 which engage corresponding recesses provided in the end segments 16, thereby locking the end segments 16 in position and preventing their outward expansion, in both in the axial and radial directions, away from the central axis of the mandrel 12.

Moreover, each of the end segments 16 is formed so as to exhibit an inwardly facing shoulder surface 26. Correspondingly, each axial end of each of the drum segments 14 is provided with an outwardly facing shoulder surface 28. In the assembled configuration, as shown in FIG. 1, the shoulder surfaces 28 provided on each end of the drum segments 14 abut the shoulder surfaces 26 provided on each of the end segments 16. Inasmuch as the end segments 16 are restrained against outward radial expansion through their interaction with the lock ring flanges 24, the provision of the opposing shoulder surfaces 26 and 28 serves to secure the entire tire forming drum assembly against any outward movement of any of the individual and discrete components thereof.

In the particular preferred embodiment shown in FIG. 1, the inboard lock ring 18 is secured to the mandrel 12 through the provision of a lock ring bolt 30, while the outboard lock ring 20 is made up of two separate lock ring members 32 and 34, these being secured to one another through the provision of another bolt 36. The lock ring member 34 and the outboard end of mandrel 12 are provided with corresponding threads 38, thus allowing the outboard lock ring 20 to be unscrewed from the mandrel 12 as a first step in the disassembly of the tire forming drum 10. Further aspects of the disassembly process are discussed more fully below.

As noted above, one object of the present invention is the provision of tire forming drums which, due to their substantial reduction in weight and high degree of concentricity and roundness, enable their use in conjunction with the prior art tire making machinery to permit such machinery to be employed in the manufacture of tires of greater size than the machinery was originally designed to produce. To this end, a number of the individual components described above which make up the present invention (e.g., drum segments 14 and/or end segments 16) are preferably formed from a relatively lightweight high-impact polymer. Even more preferably, the lightweight high-impact polymer employed is manufactured by E.I. Dupont De Nemours & Co., Inc., Elastomer Chemicals Dept., Wilmington, Del., 19898 under the trade name "Hytrel" and generally consists of a durometer polymer which has a high hardness and flexural modulus for polyester elastomers. Two of the Hytrel polymers which have been successfully used in testing the present invention are number 7245 and 6345. Hytrel 7245 is harder than 6345. These Hytrel polymers were extruded initially by an outside processor who followed the engineering design, material specifications and processing standards specified by the engineering department of McCreary Tire and Rubber Co., an operating company of Polymer Enterprises Inc. From these extrusions, the pieces of the present drums were made. At extrusion, a fiberglass material in one embodiment of the invention was added to both the Hytrel 7245 and the Hytrel 6345 materials. The fiberglass content of the extruded Hytrel according to an embodiment of the invention is preferably in the range of 1 to 5 percent and may be even in the range of 2 to 4 percent or 3 percent. However, ranges of fiberglass outside of the 1 to 5 percent may also be used if the Hytrel or other material were adapted for a higher percentage of fiberglass. A fuller description of the polymer Hytrel is to be found in page numbers 6345, 7245, E-00860, E-00862, and E-00869 of Dupont Information Sheets, which documents are hereby expressly incorporated by reference as if the contents thereof were explicity set forth in full herein.

Additionally, in order to achieve an even further reduction in weight, drum segments 14 are preferably machined or otherwise shaped from such a high-impact polymer so as to exhibit a pair of internal voids 40, separated by a generally axially centrally located flange 42.

From the foregoing discussion, it would be appreciated that, in the assembled configuration shown in FIG. 1, the individual and discrete components which make up the tire forming drum assembly 10 are securely interlocked such that they function as a single integral, substantially monolithic structure. Thus, the various tire biases and constituents may be built up on the circular periphery of the drum 10 with remarkably little distortion. Following the construction of the uncured tire preform on drum 10, the drum 10 is designed such that it may be collapsed inward towards the central axis to allow its removal from within the tire preform. Thus, following removal of the outboard lock ring 20, the mandrel 12 may be driven out of the assembly, e.g., in the inboard direction. Thereafter, due to the unique construction of drum segments 14, shown more fully in FIGS. 2 and 3, the entire drum 10 may be removed piecewise from the interior of the tire preform.

Figure 2:
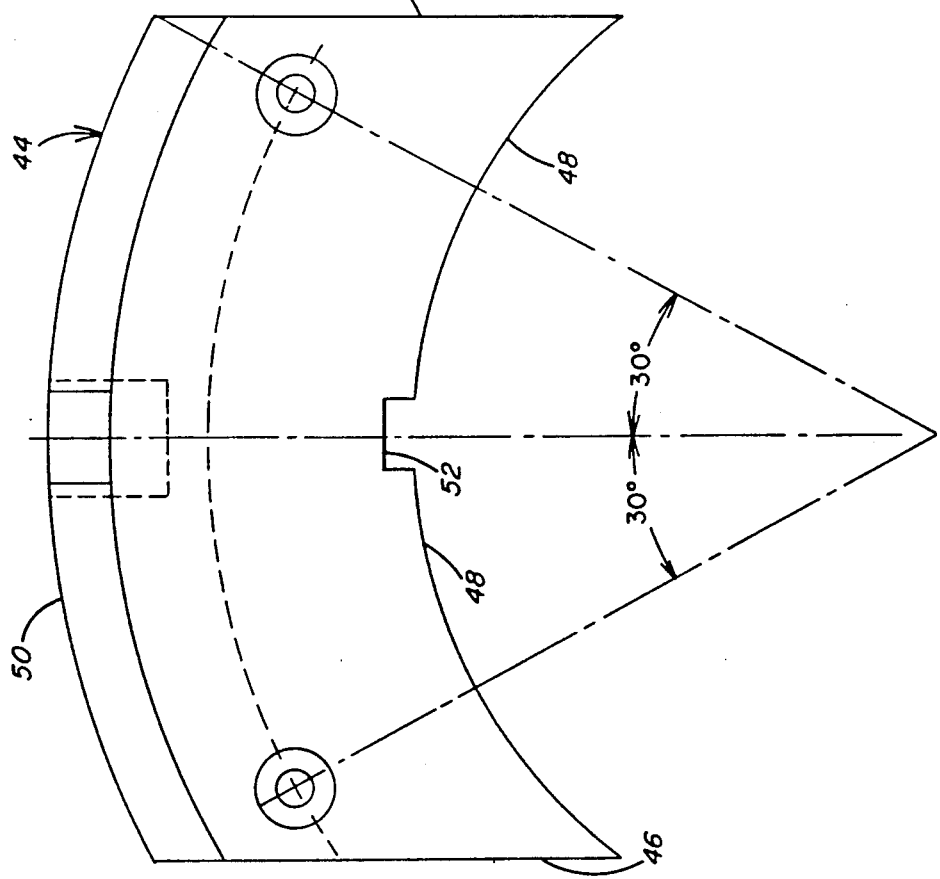
FIG. 2 is an end plan view of a "key" drum segment employed in the construction of the tire forming drums shown in FIG. 1.

FIG. 2 is an end plan view of a "key" drum segment 44, two of such key drum segments 44 being preferably employed in the practice of the invention. As shown, each key drum segment 44 is provided with substantially coparallel end faces 46 connecting its inner surface 48 and outer surface 50. Prior to removal of mandrel 12 the inner surface 48 abuts thereagainst, and each key drum segment 44 is thereby restrained against inward radial movement. Following removal of the mandrel 12, however, each of the preferably two key drum segments 44 is free to collapse inward towards the central axis where they then can be removed through an open end of the tire preform.

Also, as shown, each key drum segment 44 is preferably provided with a keyway 52 which, in the assembled configuration, engages an intergally formed key provided on the mandrel 12, so as to prevent rotational movement about the central axis between each key drum segment 44 and the mandrel 12.

Figure 3:
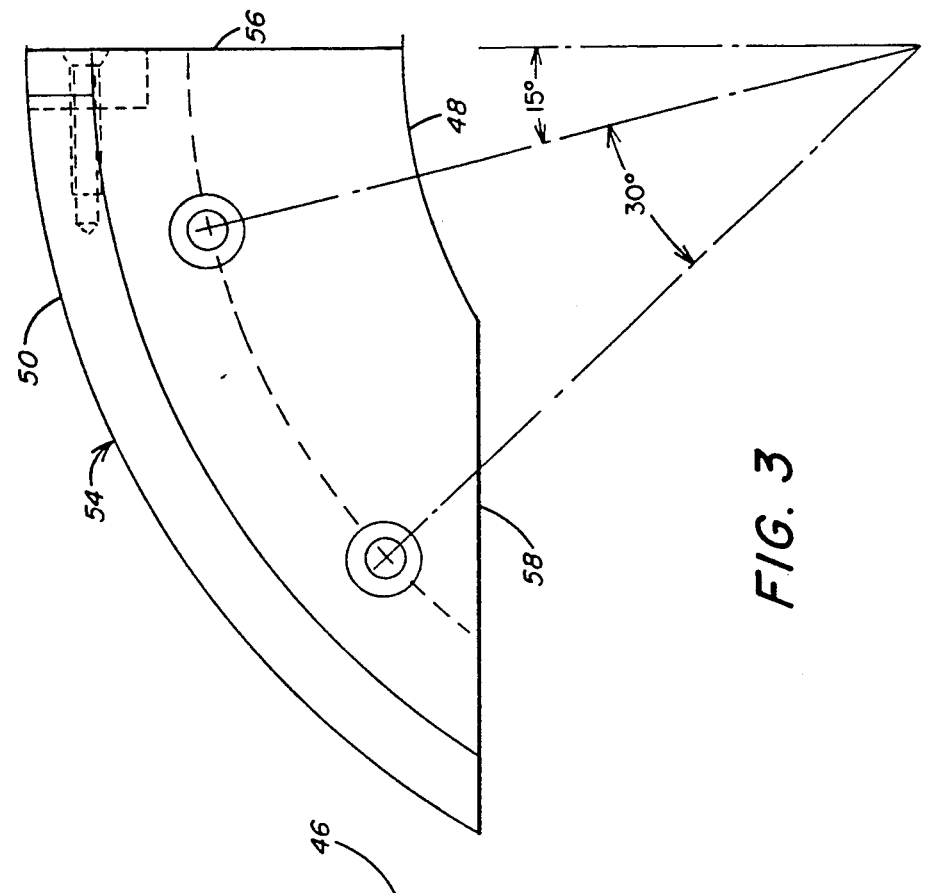
FIG. 3 is an end plan view of additional drum segments employed in the construction of the tire forming drums shown in FIG. 1.

In FIG. 3, is shown one of the remaining four drum segments 54 preferably employed in practicing the invention. Two of the three remaining drum segments 54 are essentially mirror images of the drum segment 54 shown in FIG. 3, and it will be appreciated by those skilled in the art that the two key drum segments 44 together with the four remaining drum segments 54 serve to provide a cylindrical surface upon which the tire preform may be constructed.

As shown in FIG. 3, each of the remaining drum segments 54 is provided with a substantially radially oriented end face 56 and an end face 58 which is substantially nonradially oriented but which substantially aligns with one of the coparallel end faces 46 provided on a key drum segment 44. Additionally, each of the remaining drum segments 54 is provided with an inner surface 48 which contacts the mandrel 12 and an outer surface 50 which forms a portion of the tire forming surface.

Figure 4:
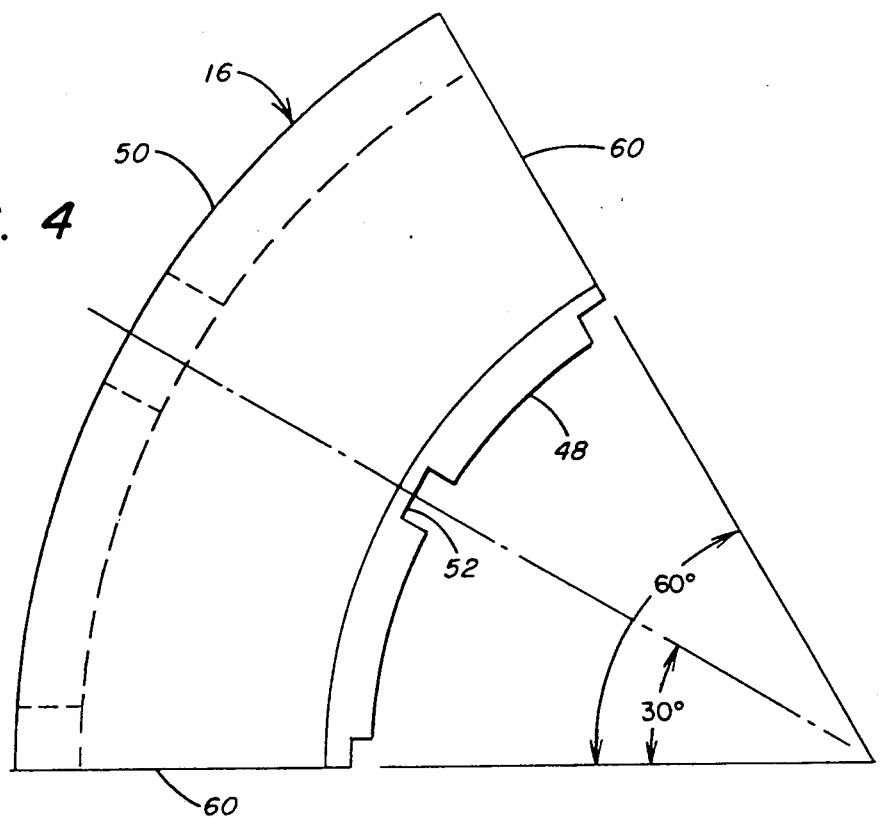
FIG. 4 is an end plan view of one type of end segment employed in the construction of the tire forming drums shown in FIG. 1, according to one embodiment of the invention.
Figure 5:
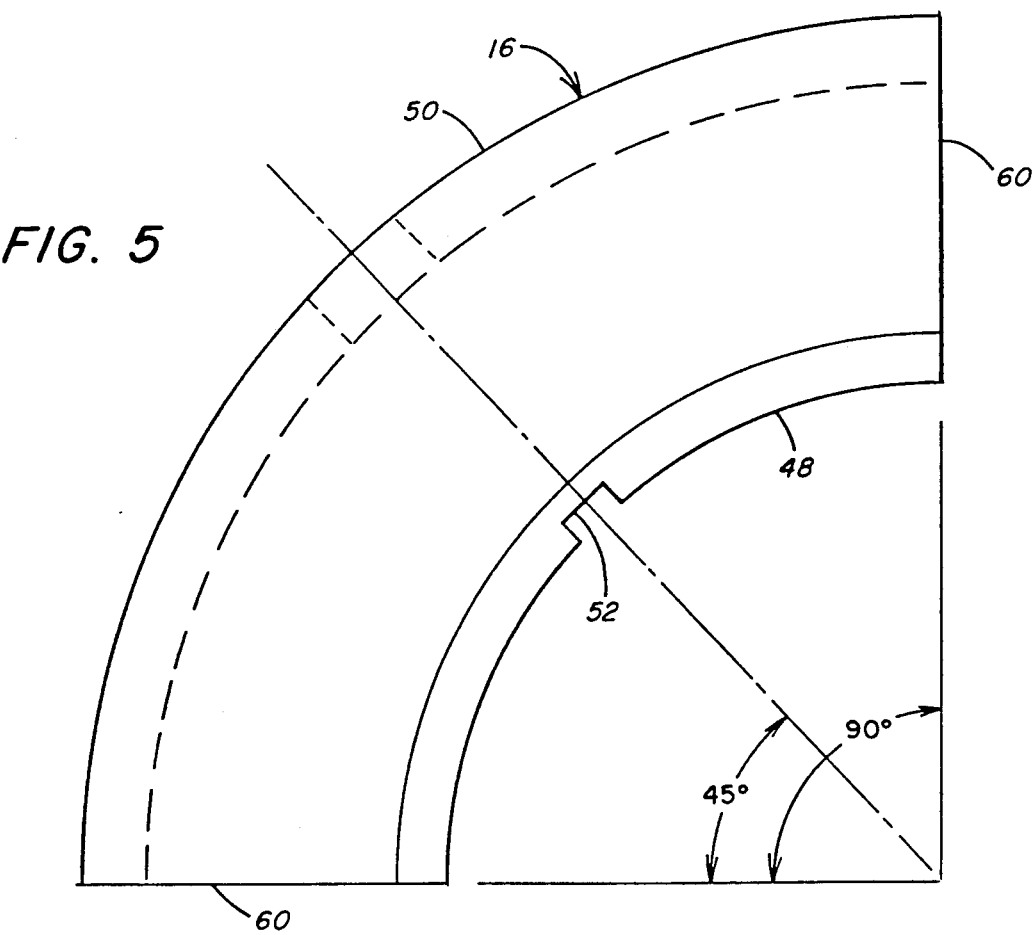
FIG. 5 is an end plan view of another end segment employed in the construction of the tire forming drums shown in FIG. 1, according to another embodiment of the invention.

In FIGS. 4 and 5 are shown two different embodiments of end segments 16 employed in alternative embodiments for the practice of the invention, identical reference numerals being used to denote similar elements.

In the embodiment shown in FIG. 4, twelve end segments 16, each end segment 16 having an angular dimension (i.e., covering an arc) of about 60 degrees, are employed, six end segments 16 being disposed on each axial end of the drum segments 14. Each of the end segments 16 shown in FIG. 4 is also provided with an inner surface 48 which contacts mandrel 12 and an outer surface 50 which forms a portion of the tire forming surface, as well as a keyway 52 which coacts with a key integrally formed in mandrel 12 so as to prevent rotational movement therebetween.

Also, as shown, each end segment 16 is provided with two substantially radially oriented and planar end faces 60. It will be appreciated that, due to the radial orientation of end faces 60, after removal of the mandrel 12, the end segments 16 will not be free to move inward towards the central axis of the assembly. However, following removal of at least one of the key drum segments 44 and, thereafter, at least some of the remaining drum segments 54, sufficient maneuvering space is afforded such that end segments 16 may be withdrawn from the tire preform.

It has been discovered by the present inventors that an embodiment employing 60 degree end segments 16, as shown in FIG. 4, is preferably used for the construction of tire forming drums which have an axial length of 16.5 inches or less.

Referring now to FIG. 5, in another embodiment of the invention, end segments 16 having an angular dimensioning of about 90 degrees are preferably employed. The present inventors have discovered that an embodiment employing 90 degree end segments 16, as shown in FIG. 5, is most suitable for tire forming drums which have an axial length of 17.0 inches or more.

Figure 6:
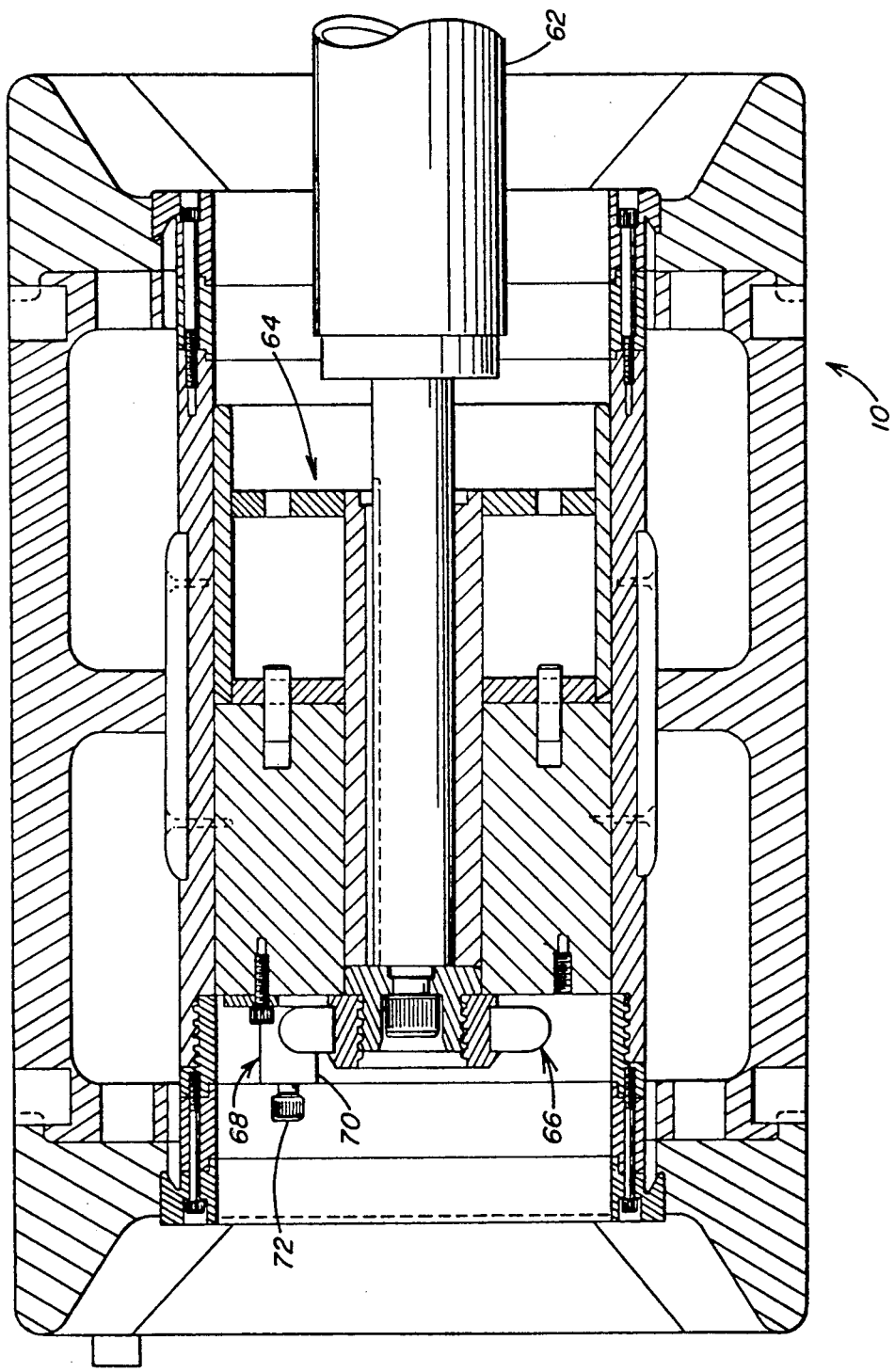
FIG. 6 is an axial cross-sectional view of a tire forming drum constructed according to the invention, wherein the drum is shown mounted on the shaft of a tire making machine.

Referring now to FIG. 6, as is well known in the art, the machinery generally employed in the tire production process usually includes a driven shaft 62. Preferably, the tire forming drum 10 constructed according to the present invention may be coupled to a shaft 62 through the provision of a frame 64 which may be positioned within the mandrel 12 and attached (e.g., through the use of bolts or other means well known in the mechanical arts) to the mounting hub 22. A shaft nut 66 may be then employed to secure the entire assembly to the shaft 62.

In order to prevent any slippage, the present inventors have discovered that it is preferable to lock the shaft nut 66 and thereby prevent any possible loosening thereof through the provision of a locking mechanism 68 which generally includes a locking member 70 and a locking bolt 72.

Figure 7:
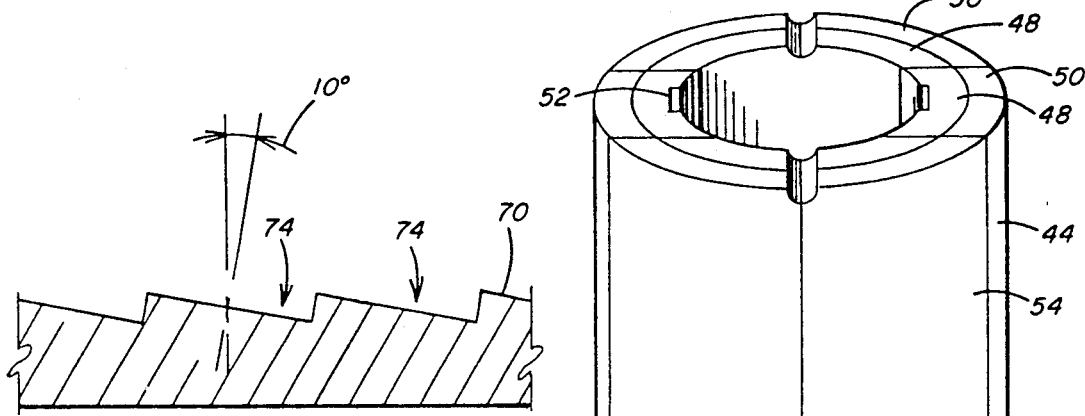
FIG. 7 is a cross-sectional view of a locking member employed in mounting the tire forming drum of the present invention on a conventional tire making machine, as shown in FIG. 6.

The locking member 70 is preferably constructed in the form of an arc-shaped member and is, as illustrated in FIG. 7, shaped so as to exhibit, on the surface which engages the head of bolt 72, a series of steps 74 which engage the head of bolt 72 Should any slight loosening of bolt 72 occur, the provision of the steps 74 serve to prevent any loosening of the locking mechanism 68 and, therefore any loosening of shaft nut 66.

Referring back now to FIG. 1, and most particularly to the upper portion thereof, in yet another alternative embodiment of the invention, a plurality of spacer segments 76 are employed to allow the tire forming drum 10 of the present invention to be extended in the axial direction, thus permitting the easy and ready construction of drums 10 of various lengths. As shown in the upper right and left portions of FIG. 1, the present invention contemplates the use of spacer segments 76 of varying axial lengths.

Preferably, spacer segments 76 will be of the same angular dimensioning when viewed in end plan view as drum segments 14. That is, they will be configured as shown in FIGS. 2 and 3 discussed more fully above. Accordingly, spacer segments 76 may be conveniently secured to drum segments 14 through the provision of attachment bolts 78 or through other means well known in the art. Additionally, each spacer 76 is preferably provided with a pair of shoulder surfaces 80 which, in the assembled configuration, engage the shoulder surfaces 26 and 28 provided on the end segments and drum segments, respectively, thereby further insuring a secure interlocking of the entire drum assembly 10 and preventing any undesirable outward movement of any of the assembled components.

In the embodiments wherein spacer segments 76 are employed, a mandrel spacer 82 is preferably used to correspondingly extend mandrel 12 in the axial direction. As shown, mandrel spacer 82 may be secured to mandrel 12 by lock ring bolt 30, or by any other means well known in the mechanical arts.

As is well known by those skilled in tire making, tire preforms are often constructed so as to have a tire bead at either or both ends. To this end, end segments 16 are preferably formed so as to exhibit a generally inward curving tire bead forming surface 84, the exact geometry of which will be readily apparant to those skilled in the art. The angle which the surface 84 makes with the outer surfaces of the drum segments 14 is preferably about 35 degrees but may be in a range of other angles depending upon the tire being fabricated and the geometry of this tire.

Finally, it will be readily understood that the dimensionings of end faces 46, 56, 58 and 60 shown in FIGS. 2-6 may, within limits, be adjusted according to the diameter of mandrel 12 employed. The present inventors have also discovered that adherence to tolerances in the final finished product are benefited by dimensioning the drum assembly such that the end faces exhibit relatively large contact surfaces. Preferably, end faces 46, 56, 58 and 60 will have a transverse dimension (i.e. a nonaxial dimension) of between about 5 inches. The dimension chosen for the key sections 44 of the drum 10 are dimensions such that they can be easily withdrawn from the hole formed by the mandrel 12 after at least one of them has been pushed in towards the space formally occupied by the mandrel 12. The size of the side surfaces of these key drum pieces 44 are small enough that they can be easily withdrawn from the central hole which the mandrel 12 occupied but not so short that the dimension stability of the drum is sacrificed. If the walls of the key sections 44 are too short, they would not supply the dimensional stability of the drum which provides for the very fine performance of the present invention. However, if the sides are too long, the key section 44 is difficult to extract and therefore, makes it more difficult to use in production.

Figure 8:
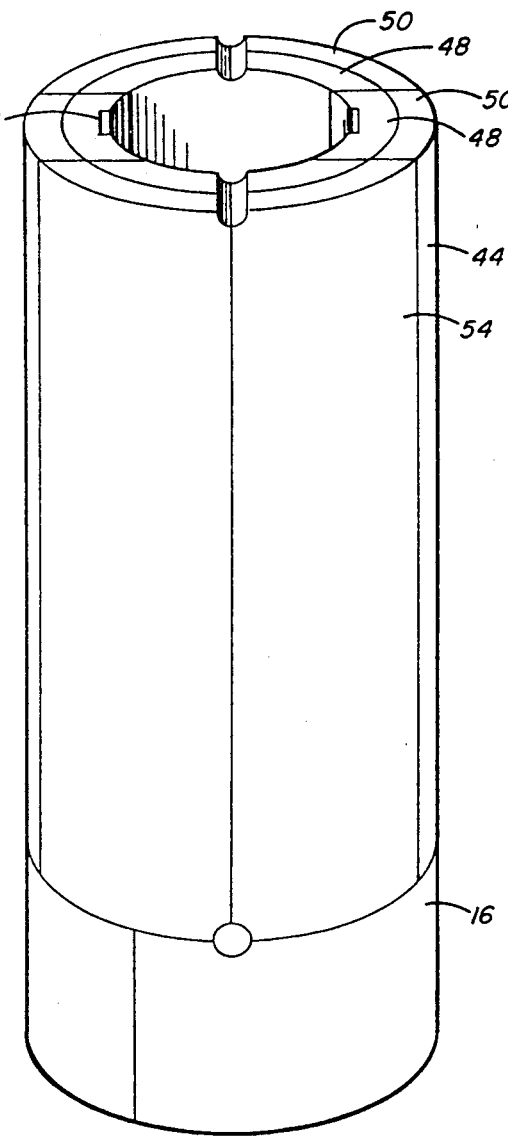
FIG. 8 is a perspective view of a partially assembled tire forming drum according to an embodiment of the invention.

FIG. 8 shows a partially assembled tire forming drum having the top end segment members 16 missing. Like parts of this FIG. 8 have the same reference numerals as the other drawings.

A number of dimensions and tolerances are shown on the drawings of the various parts. These references and drawings are a part of the specification and are incorporated into the specification in their entirety.

While the present invention has been described by way of particular preferred embodiments, it will be apparant to those skilled in the art that various substitutions of equivalents may be effected without departing from the spirit or scope of the invention as set forth in the following claims:

What is claimed is:

1. A kit for the construction of a tire forming drum, said tire forming drum having, in an assembled configuration, a tire forming surface for the formation of a tire preform thereon, said kit comprising a plurality of assemblable and disassemblable individual and discrete components, said components comprising:
   a removable mandrel having a substantially central axis and a peripheral surface substantially encircling said central axis;
   a plurality of arcuate drum segment members for substantially encircling, in the assembled configuration, said mandrel;
   said plurality of arcuate drum segment members comprising a polymer;
   said arcuate drum segment members defining a smooth, circular cylindrical surface having a constant radius when in the assembled configuration;
   said arcuate drum segment members having a side surface for contacting another arcuate drum segment member; said drum having a circularly cylindrical outer surface;
   said arcuate drum segment members comprising unitary pieces;
   each of said plurality of arcuate drum segment members having an inner surface which, in the assembled configuration, at least partially contacts said peripheral surface of said mandrel for thereby substantially preventing inward radial movement of said plurality of arcuate drum segment members towards said central axis of said mandrel;
   locking means for substantially preventing outward movement of said plurality of arcuate drum segment members away from said central axis in the assembled configuration; and
   said locking means including means for inwardly curving the bead portion of a tire being formed, said means for inwardly curving the bead portion including surfaces for engaging corresponding surfaces on said arcuate drum segment members;
   said means for inwardly curving the bead portion of a tire comprising a tire bead forming lip;
   means for permitting translation of at least one of said plurality of arcuate drum segment members towards said central axis upon removal of said removable mandrel.

2. The kit for the construction of a tire forming drum according to claim 1, wherein each of said plurality of arcuate drum segment members has an outer surface, said outer surfaces of a first plurality of segment members forming, in the assembled configuration, at least a portion of said tire forming surface, said inner and outer surfaces of each of said plurality of arcuate drum segment members being joined by a pair of opposing end faces, both of said end faces of each of said plurality of arcuate drum segment members contracting, in the assembled configuration, another end face of another of said plurality of arcuate drum segment members, and wherein said means for fran Permitting translation at least one of said plurality of arcuate drum segment members towards said central axis upon removal of said removable mandrel comprises said pair of end faces of at least one of said plurality of arcuate drum segment members being oriented substantially coparallel to one another.

3. The kit for the construction of a tire forming drum according to claim 2, wherein both of said pair of end faces of said at least one of said plurality of arcuate drum segment members are additionally oriented substantially nonradially with respect to said central axis.

4. The kit for the construction of a tire forming drum according to claim 2, wherein both of said pair of opposing end faces of each of said plurality of arcuate drum segment members are substantially planar surfaces.

5. The kit for the construction of a tire forming drum according to claim 3, wherein both of said pair of opposing end faces of each of said plurality of arcuate drum segment members are substantially planar surfaces.

6. The kit for the construction of a tire forming drum according to claim 1, wherein said locking means comprises at least one lock ring member and a plurality of arcuate end segment members;
   said plurality of arcuate end segment members for substantially encircling, in the assembled configuration, said mandrel;
   each of said plurality of arcuate end segment members having an inner surface which, in the assembled configuration, contacts said peripheral surface of said mandrel for thereby substantially preventing inward radial movement of said plurality of arcuate end segment members towards said central axis of said mandrel;

each of said plurality of arcuate end segment members having an outer surface which, in the assembled configuration, comprises at least a portion of said tire forming surface and means for inwardly curving the bead portion;

said inner and outer surfaces of each of said plurality of arcuate end segment members being joined by a pair of opposing end faces, both of said end faces of each of said plurality of arcuate end segment members contacting, in the assembled configuration, another end face of another of said plurality of end segment members;

wherein said lock ring member is secured to said removable mandrel and engages said plurality of arcuate end segment members for substantially preventing, in the assembled configuration, outward movement of said plurality of arcuate end segment members away from said central axis; and said plurality of arcuate end segment members engages said plurality of arcuate drum segment members for substantially preventing, in the assembled configuration, outward movement of said plurality of arcuate drum segment members away from said central axis.

7. The kit for the construction of a tire forming drum according to claim 6, wherein said locking means comprises an additional lock ring member to form a pair of lock ring members and said plurality of arcuate end segment members comprising at least two sets of arcuate end segment members, said pair of lock ring members being, in the assembled configuration, secured to opposing ends of said removable mandrel and each of said lock ring members engaging one of said sets of arcuate end segment members, and each of said sets of arcuate end segment members engaging opposing ends of said plurality of arcuate drum segment members.

8. The kit for the construction of a tire forming drum according to claim 6, wherein said locking means further comprises:
at least one lock ring member secured to said removable mandrel and engaging said plurality of arcuate end segment members in the assembled configuration; and
said plurality of arcuate drum segment members having shoulder surfaces; said plurality of arcuate end segment members having shoulder surfaces; said shoulder surfaces of said plurality of arcuate drum segment members and said shoulder surfaces of said plurality of arcuate end segment members mating and abutting one another during assembly.

9. The kit for the construction of a tire forming drum according to claim 6, said kit further comprising:
a plurality of arcuate spacer segment members for substantially encircling, in the assembled configuration, said mandrel;
said plurality of arcuate spacer segment members being disposed between said plurality of arcuate drum segment members and said plurality of arcuate end segment members;
and wherein said locking means additionally comprises means for substantially preventing, in the assembled configuration, outward movement of said plurality of arcuate spacer segment members away from said central axis.

10. The kit for the construction of a tire forming drum according to claim 9, wherein said locking means further comprises:
at least one lock ring member secured to said removable mandrel and engaging said plurality of end segment members in the assembled configuration; and
said plurality of arcuate drum segment members having shoulder surfaces; said arcuate end segment members having shoulder surfaces; said arcuate spacer segment members having shoulder surfaces; said shoulder surfaces abutting one another in the assembled configuration.

11. The kit for the construction of a tire forming drum according to claim 10, wherein said central axis of said mandrel defines an axial direction, wherein said plurality of arcuate end segment members comprises at least two sets of arcuate end segment members, wherein said plurality of arcuate spacer segment members comprises at least two sets of arcuate spacer segment members and wherein, in the assembled configuration, one of said sets of arcuate spacer segment members is interposed between, in the axial direction, each axial end of said plurality of arcuate drum segment members and one of said sets of arcuate end segment members.

12. The kit for the construction of a tire forming drum according to claim 1, wherein at least one of said plurality of assemblable and disassemblable individual and discrete components comprises a high impact polymer.

13. The kit for the construction of a tire forming drum according to claim 1, further comprising rotational locking means for substantially locking, in the assembled configuration, said mandrel and said plurality of drum segment members against rotational movement therebetween about said central axis.

14. The kit for the construction of a tire forming drum according to claim 1, wherein said kit additionally comprises at least two pluralities of arcuate drum segment members of different sizes for the construction on said mandrel of at least two tire forming drums having substantially differing dimensions.

15. The kit for the construction of a tire forming drum according to claim 9, wherein said kit additionally comprises at least two pluralities of arcuate drum segment members of different sizes and at least two pluralities of arcuate spacer segment members of different sizes for the construction of at least two tire forming drums of substantially differing dimensions.

16. The kit for the construction of a tire forming drum according to claim 9, said kit further comprising at least one mandrel spacer member for extending said mandrel in the axial direction and means for securing said mandrel spacer member to said mandrel.

17. The kit for the construction of a tire forming drum according to claim 6, wherein said plurality of arcuate end segment members comprises at least one set of arcuate end segments comprising four arcuate end segments each having an angular dimensioning about said central axis of about 90 degrees.

18. The kit for the construction of a tire forming drum according to claim 6, wherein said plurality of arcuate end segment members comprises at least one set of arcuate end segments comprising six arcuate end segments each having an angular dimensioning about said central axis of about 60 degrees.

19. The drum according to claim 1, wherein said locking means comprises a second plurality of arcuate segment members, each of said second plurality of arcuate segment members having a surface for engaging one of said plurality of arcuate drum segment members, in the assembled configuration, and for thereby preventing movement transverse to said central axis thereof.

20. A drum for assembling thereon a series of plies to form a green tire, according to claim 19, wherein said polymer comprises a high impact polymer.

21. A drum for assembling thereon a series of plies to form a green tire, according to claim 20, wherein said high impact polymer comprises fiberglass additive.

22. A drum for assembling thereon a series of plies to form a green tire, said drum comprising a plurality of assemblable and disassemblable individual and discrete components, said components being particularly adapted, in an assembled state, for the construction thereon of an uncured tire, said components comprising:

a mandrel having a substantially central axis and a peripheral surface encircling said central axis;

a plurality of arcuate drum segment members substantially encircling, in the assembled configuration, said mandrel;

said plurality of arcuate drum segment members comprising a plastic material;

said arcuate drum segment members defining a smooth, circular cylindrical surface having a constant radius when in the assembled configuration;

each of said plurality of arcuate drum segment members having a pair of opposing circumferential end faces, each for engaging a circumferential end face provided on another of a plurality of arcuate drum segment members;

said pair of circumferential end faces provided on at least one of said plurality of arcuate drum segment members being disposed substantially parallel to one another;

said arcuate drum segment members having a side surface for contacting another arcuate drum segment member; said drum having a circularly cylindrical outer surface;

said arcuate drum segment members having unitary pieces;

interlocking means for interlocking, in the assembled configuration, said mandrel and each of said plurality of arcuate drum segment members against any substantial movement therebetween;

locking means including means for inwardly curving the bead portion of a tire being formed, said means for inwardly curving the bead portion including surfaces for engaging corresponding surfaces on said arcuate drum segment members;

said means for inwardly curving the bead portion of a tire comprising a tire bead forming lip; and said locking means comprising a plurality of end segment members for substantially encircling, in the assembled configuration, said mandrel with said interlocking means and said end segment members being relatively adapted with respect to said interlocking means for said interlocking means to be disengaged from said drum segment members before said end segment members are removed from substantially encircling said mandrel when the drum is being changed from said assembled configuration to said disassembled configuration.

* * * * *

UNITED STATES PATENT AND TRADEMARK OFFICE
CERTIFICATE OF CORRECTION

PATENT NO. : 5,127,979
DATED : July 7, 1992
INVENTOR(S) : Donald D. Mateer and John S. PODGORSKI It is certified that error appears in the above-indentified patent and that said Letters Patent is hereby corrected as shown below:

Col. 8, Claim 2, line 29, after 'members', delete "contracting" and insert --contacting--.

Col. 8, Claim 2, line 13, after 'for', delete "fran Permitting" and insert --permitting--.

Col. 8, Claim 2, line 13, after 'translation', insert -- of --.

Signed and Sealed this

Thirty-first Day of August, 1993

Attest:

BRUCE LEHMAN

*Attesting Officer*    *Commissioner of Patents and Trademarks*